United States Patent Office

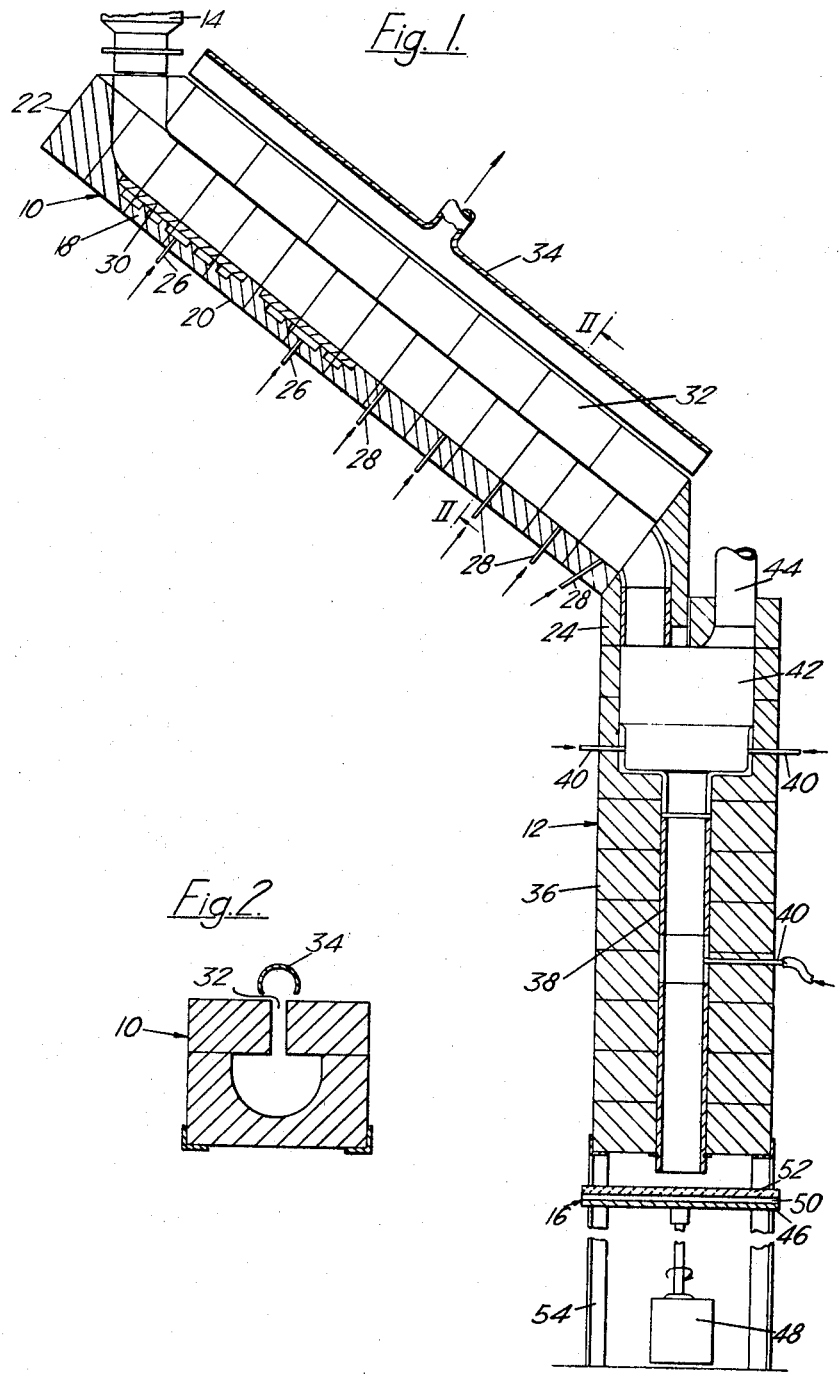

3,384,454
Patented May 21, 1968

3,384,454
METHOD OF CALCINING ALUMINUM HYDROXIDE BY CROSS-FLOWING THE HEATING GAS
Robert Ross Barrington, Luton, England, assignor to General Motors Corporation, Detroit, Mich., a corporation of Delaware
Filed Feb. 24, 1965, Ser. No. 434,870
Claims priority, application Great Britain, Mar. 4, 1964, 9,052/64
3 Claims. (Cl. 23—142)

ABSTRACT OF THE DISCLOSURE

An improved method of producing high purity alumina which includes the step of calcining aluminum hydroxide under conditions which cause the gaseous products of calcination to be removed from the vicinity of the solid material immediately after their production by sweeping them away in a cross-flow of combustion gases thereby preventing the gaseous products from contaminating the alumina.

---

This invention relates to an improved method of producing alumina from aluminum hydroxide, for example an aluminum hydroxide derived from aluminum trihydroxide produced by the Bayer process. The invention also relates to a new form of alumina having properties making it highly suitable for the production, by moulding and firing, of sintered high-alumina refractory bodies, for example spark plug insulators.

Calcined alumina (*alpha* alumina) forms a constituent of high-alumina insulator for use in spark plugs. Such insulators are made by mixing the alumina with other materials in an amount up to 10% of the weight of the resulting refractory mix, one or more of these materials usually acting as a flux, whereupon the refractory mix is moulded to give a shaped insulator blank, and the insulator blank is fired to produce the desired sintered high-alumina refractory body. Shrinkage occurs during firing, and to obtain a consistent product the amount of shrinkage as between various batches of the alumina should be constant. It is also desirable that the amount of shrinkage be low, to minimise distortion during firing.

According to the present invention, in a method of producing alumina by calcination of an aluminum hydroxide, the calcination is effected under conditions allowing escape of the gaseous products of the calcination from the vicinity of the solid material immediately after their production.

Also according to the invention, from another aspect, in a method of producing alumina by calcination of an aluminum hydroxide, the calcination is effected under conditions allowing escape of the gaseous products of the calcination from the vicinity of the solid material before the temperature of the solid material exceeds 1,000° C.

Preferably the gaseous products of the calcination are removed continuously from the vicinity of the solid material. The continuous removal of the gaseous products of the calcination is conveniently effected by sweeping them away from the vicinity of the solid material in a cross-flow of combustion gases.

The preferred calcination temperature is between 1,300° and 1,400° C.

The aluminum hydroxide which is calcined is preferably an aluminum monohydroxide obtained by partial dehydration of aluminum trihydroxide produced by the Bayer process. Such aluminum trihydroxide generally contains soda, as virtually the only impurity, in an amount of about 0.5% $Na_2O$ by weight. For the production of a calcined alumina having a sufficiently high purity for the production of spark plug insulators and other insulators which must have a very low electrical conductivity, it is desirable to reduce this soda content, conveniently by volatilisation of the soda as sodium borate during the calcination.

For this purpose the aluminum hydroxide is preferably subjected to the calcination in admixture with boric acid in a quantity sufficient to effect volatilisation of subsequently the whole of the soda content of the aluminum hydroxide during the calcination. A suitable quantity of boric acid is generally between 1% and 5% of the weight of the aluminum hydroxide. Preferably the aluminum hydroxide is subjected to the calcination additionally in admixture with a small proportion of fluoride ion, which has the effect of speeding up the conversion occurring during calcination.

To achieve the desired escape of the gaseous products of the calcination from the vicinity of the solid material, the calcination is preferably effected in a furnace comprising an inclined refractory tube down which the aluminum hydroxide can pass, the furnace also including a series of burner devices extending along the bottom of the tube, and a vent extending along the top of the tube for escape of the gaseous products of the calcination. Because the vent extends the whole length of the tube, the gaseous products of calcination which are swept away from the solid material by a cross-flow of combustion gases from the burner devices can escape in a relatively unrestricted manner, so reducing the danger of contamination of the solid material by these soda-rich gaseous products.

The aluminum hydroxide may be supplied to the upper end of the refractory tube, which may be at an angle of inclination of approximately 45°, through a feed hopper or other feed device. The burner devices are preferably constructed to project the combustible gas at a velocity greater than that of flame propagation, whereby combustion occurs within the mass of the particulate material.

It is desirable for the furnace to include a heat-soak device for the reception of the material discharged from the inclined tube, and to control the rate of cooling of this material. The heat-soak device can consist of a vertical tube provided with burners for maintaining the material received from the inclined tube at a controlled but decreasing temperature as it passes down the vertical tube. The calcined material is preferably removed from the discharge end of the heat-soak device by means of a rotary scraper or other take-off device.

With such a furnace, the feed hopper can provide a constant supply of material at the upper end of the inclined tube and the material to be calcined can be made to pass through the furnace continuously and at a controlled speed by setting the speed of the take-off device to a value which gives a suitable discharge rate of calcined material from the lower end of the heat-soak device. The material to be calcined is preferably in the form of coherent ball-shaped masses, and slides or rolls down the inclined tube as it is subjected to calcination, the fresh material being continuously supplied as required from the feed hopper.

The ball-shaped masses may be produced by heating aluminum trihydroxide, preferably produced by the Bayer process, to reduce its water content to between 5% and 8% by weight, the preferred water content being 8% by weight, and grinding the resulting material. The ground material is then preferably treated with a solution of boric acid, and the treated material is formed into coherent ball-shaped masses, for example by tumbling in a conventional rotary tabletting pan. To reduce the water content, a temperature of about 300° C. is suitable.

The amount of boric acid solution is preferably such that a quantity of boric acid between 1% and 5% of the weight of the aluminum hydroxide is incorporated in the ground material. A small proportion of fluoride ion may additionally be admixed with the ground material, for example by the addition of hydrofluoric acid.

A calcined alumina can be produced in accordance with the present invention consisting of crystals of *alpha* alumina having a fine crystal structure such that on grinding they break down to produce almost symmetrical particles having a mean crystal size of substantially 2 microns. In spite of this very small crystal size, the calcined alumina is not bulky, and is highly compactable. The calcined alumina also has a very low soda content, consistently less than 0.02% by weight residual $Na_2O$. This low soda content is attributable to the rapid escape of the volatilised sodium borate forming one of the gaseous products of the calcination.

This calcined alumina is highly suitable for the production of sintered high-alumina refractory bodies, for example spark plug insulators, by firing a refractory mix containing not less than 90% by weight of the calcined alumina, since it gives rapid maturing, so allowing the use of a relatively low firing temperature. The calcined alumina also gives relatively low shrinkage during firing.

The scope of the monopoly is defined by the appended claims. The invention is further illustrated in the following examples of the invention, which are compared with control experiments not in accordance with the invention.

EXAMPLE 1

Aluminum trihydroxide produced by the Bayer process was heated to a temperature of 300° C. until its water content had fallen to about 8% by weight, and was then ground, admixed with 2% by weight of boric acid and 0.5% by weight of hydrofluoric acid, and formed into coherent ball-shaped masses by tumbling in a rotary tabletting pan. The ball-shaped masses were then calcined at a temperature of around 1,400° C. for a period of 30 mins. in a calcination furnace as shown in the accompanying drawings (and described later herein). The product of the calcination was an *alpha* alumina in the form of very small crystals with a mean crystal size of 2 microns and a compactability of about 0.340 in.

This compactibility figure is a value related to the ultimate compactability of the alumina, and is the length in inches of a 10 gram sample of the alumina in a cylinder having an interior diameter of 1 inch after the sample has been subjected to 100 impacts of a force determined by a standard spring. The cylinder used has an effective weight of 1.75 lbs. when containing the sample, and the spring exerts a maximum force of 4.5 lbs. on the cylinder.

The calcined alumina (*alpha* alumina) produced as described in this example was found to be highly suitable for the production of spark plug insulators, since the alumina was of high purity, having a soda content below 0.01% $Na_2O$, and had a high rate of maturing to produce sintered insulating bodies, the bodies produced having a relatively high density.

Control experiment 1

A commercial aluminum trihydroxide produced by the Bayer process was admixed with 2% by weight of boric acid and 0.5% by weight hydrofluoric acid, and the resulting material was placed in an open-topped sagger and calcined in a periodic kiln. The calcination was effected at a temperature of 1,400° C. for a period of 30 mins., and the product was found to consist of large plate-like crystals of *alpha* alumina which had a particle size up to 20 microns and were not very suitable for firing to form spark plug insulators because they were slow to mature to maximum density and had a high soda content, approximately 0.05 to 0.1% by weight $Na_3O$.

EXAMPLE 2

Coherent ball-shaped masses produced as described Example 1 were heated to a temperature of 1,000° C. for 15 mins., under conditions allowing escape of the gaseous products from the vicinity of the solid material immediately after their production, after which time the temperature was raised to 1,500° C. and held at this value for a further 10 mins. to complete the calcination. The outer layers of the calcined material were found to have a very fine crystal structure, and to break down to form almost symmetrical particles with a mean crystal size of substantially 2 microns. FIG. 4 of the accompanying drawings is a photomicrograph at 1000× magnification of these particles.

Control experiment 2

The procedure described in Example 2 was repeated except that the initial heating was effected at a temperature of 1,100° C. for 15 mins., again with subsequent heating to 1,500° C. for 10 mins. The outside layers of the calcined product had a large crystal structure, with a particle size from 2 microns up to 8 or 9 microns, as shown in FIG. 3 of the drawings, which again is a photomicrograph at a magnification of 1000×.

EXAMPLE 3

A high-alumina refractory mix suitable for the manufacture of spark plug insulators was made up from 90% by weight calcined alumina produced as described in Example 1, together with 10% by weight of conventional fluxing ingredients. The mix was processed in known manner to produce moulded spark plug insulator blanks, which were eventually fired in a kiln to produce spark plug insulators.

However, to follow the course of the vitrification, a batch of ten insulator blanks was subjected to simulated firing conditions in a furnace, as follows:

The ten insulator blanks were placed on a flat refractory sagger in the middle of the furnace, the temperature of which was raised at a uniform gradient over 3 hours to 1,550° C. The temperature was then held constant for 2 hours, whereupon it was raised to 1,600° C. and again held for a further 2 hours. During this program one of the insulator blanks was taken from the furnace at each of the following temperatures and times:

|     |                        | ° C.  |
| --- | ---------------------- | ----- |
| (1) | On reaching            | 1,525 |
| (2) | On reaching            | 1,550 |
| (3) | After ½ hour at        | 1,550 |
| (4) | After 1 hour at        | 1,550 |
| (5) | After 1½ hours at      | 1,550 |
| (6) | After 2 hours at       | 1,550 |
| (7) | On reaching            | 1,600 |
| (8) | After ½ hour at        | 1,600 |
| (9) | After 1 hour at        | 1,600 |
| (10)| After 2 hours at       | 1,600 |

The specific gravities of these insulator blanks were plotted against the temperature and time.

Control experiment 3

The procedure described in Example 3 was repeated except that the calcined alumina used in the refractory mix was made as described in Control experiment 1. The specific gravities were plotted on the same graph as was used in Example 3.

From the resulting combined graph it was established that as the density of the insulators increased to a maximum, those made from the alumina made according to this invention (Example 1) were consistently higher than those made from the plate-like coarsely crystalline alumina (Control experiment 1), and that to attain the same final density, insulators made from the latter had to be heated an additional 50° C.

To achieve the specific gravities indicated below, the firing times and temperatures of the respective mixes were as follows:

| Specific gravity | Mix made from 2-micron Alumina of Example 1 | Mix made from plate-like Alumina of Control experiment 1 |
| --- | --- | --- |
| 3.45 | On reaching 1,525° C | After 1 hour at 1,550° C. |
| 3.65 (max.) | After ½ hr. at 1,550° C | After ½ hour at 1,600° C. |

A calcination furnace which is highly suitable for carying out the methods according to the present invention is hereinafter particularly described with reference to the accompanying drawings, in which:

FIG. 1 is a vertical section through the calcination furnace;

FIG. 2 is a cross-section on the line II—II of FIG. 1, in the direction of the arrows;

Figure 3:
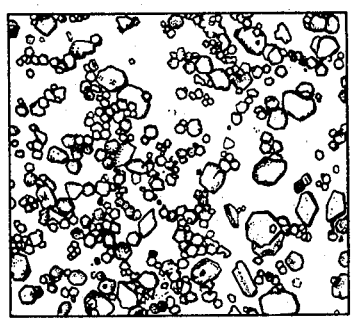
FIG. 3 is a photomicrograph similar to FIG. 3 but showing the coarsely crystalline calcined alumina referred to in Control experiment 2.
Figure 5:
FIG. 5 shows the scale divisions applicable to both FIGS. 3 and 4 the spacing of the smallest scale divisions shown being 1.8 microns.
Figure 4:
FIG. 4 is a photomicrograph at 1000× magnification, showing the finely crystalline calcined alumina referred to in Example 2.

The furnace shown in FIG. 1 of the drawings comprises an inclined refractory tube indicated generally by the reference numeral 10, a heat-soak device arranged at the lower end of the tube 10 and indicated generally by the reference numeral 12, a feed device in the form of a feed hopper 14 at the upper end of the tube 10 for the supply of particulate material to the tube, and a take-off device in the form of a rotary scraper indicated generally by the reference numeral 16 for the removal of heat-treated material from the discharge end of the heat-soak device.

The inclined tube 10 is at an angle of inclination of approximately 45° and is made of refractory block 18 with a liner of recrystallized alumina refractory material. The tube comprises a straight portion 20 and end pieces 22 and 24 constituting connections to the feed hopper 14 and the heat-soak device 12 respectively.

A series of burner devices 26 and 28 extends along the bottom of the tube 10. The burner devices 26, which are situated at the inlet portion of the tube 10, each comprise a feed pipe which opens into an annular space in the tube 10 separated from the interior of the tube by a layer of porous refractory material 30 for providing a diffuse flow of combustion gas into the tube. The burner devices 28, which are situated at the outlet portion of the tube 10, comprise tubes of recrystallized alumina refractory material constituting burner jets.

A vent 32 along the top of the tube 10 allows escape of the gaseous products of the best treatment from the vicinity of the solid particulate material in the tube immediately after their production. The vent is an elongated discharge vent constituted by a slot extending along the top of the tube 10 for the whole length of the tube. An exhaust hood 34 above the vent 32 is used to remove the gaseous products escaping from the vent.

The heat-soak device 12 is made of refractory blocks 36 with a liner 38 made of recrystallized alumina refractory material. A vertical tube forming part of the heat-soak device is provided with burner devices 40 for maintaining the material received from the inclined tube at a controlled but decreasing temperature as it passes down the vertical tube. The upper end of the vertical tube is enlarged to form an entrance chamber 42, which has an escape vent 44 at its upper end. An upper series of the burner devices 40 extends radially into the lower part of the entrance chamber 42, and a lower series of the burner devices extends into the heat-soak device about half-way down the vertical tube. The burner devices 40 are similar in construction to the burner devices 28, and likewise are made of recrystallized alumina refractory material.

The take-off device 16 comprises a horizontal disc 46 rotatable by a drive motor 48. A cross key 50 is welded to the upper surface of the disc 46 and covered by a layer of refractory material 52. The lower end of the heat-soak device is supported by struts 54.

As shown in FIG. 2, the internal cross-section of the tube 10 is generally semi-circular at its lowermost portion, and narrows to the vent 32.

In operation of the furnace, the tubular interior of the furnace is filled with particulate material to be calcined, combustion gas being supplied to the burners 26 and 28 of the inclined tube at a velocity greater than that of flame propagation so that combustion occurs within the mass of the particulate material. Combustion gas is also supplied to the burner devices 40 of the heat-soak device 12. With a constant supply of particulate material from the feed hopper 14 available at the upper end of the inclined tube 10, the speed at which the material passes through the furnace can be controlled by setting the speed of the drive motor 48 to a value which gives a suitable discharge rate of calcined material from the lower end of the heat-soak device, whereby the particulate material, which is preferably in the form of balls, slides or rolls down the tube 10 as it undergoes the calcination, fresh material being continuously supplied as required from the feed hopper 14. The burner jets 26 and 28 in the inclined tube 10 maintain a powerful cross-flow of combustion gases which remove the gaseous products of the calcination in an efficient manner by sweeping them away from the vicinity of the solid material immediately after their production, the gaseous products escaping in a relatively unrestricted manner through the vent 32 which extends along the whole length of the top of the inclined tube. The gases are then drawn off through the exhaust hood 34. The burner devices 40 in the heat-soak device 12 are set to maintain the material from the inclined tube at a controlled but gradually decreasing temperature as it passes down the vertical tube, the gaseous products evolved during residence of the material in the heat-soak device escaping through the escape vent 44.

I claim:

1. A method of producing alumina, comprising introducing an aluminum hydroxide containing boric acid in a sufficient quantity to effect volatilization of substantially the whole of the soda content of the aluminum hydroxide during the calcination into the upper end of an inclined refractory tube down which the aluminum hydroxide can pass, heating the aluminum hydroxide to a temperature between 1,300° C. and 1,400° C. by introducing a combustible gas into a series of burner devices extending along the bottom of the tube, and continuously removing the gaseous products of the calcination, immediately after their formation, through a vent extending along the top of the tube.

2. A method of producing alumina, comprising introducing an aluminum hydroxide containing boric acid in a quantity sufficient to effect volatilization of substantially the whole of the soda content of the aluminum hydroxide during the calcination into the upper end of an inclined refractory tube down which the aluminum hydroxide can pass, heating the aluminum hydroxide to a temperature between 1,300° C. and 1,400° C. by introducing a combustible gas at a velocity greater than that of flame propagation into a series of burner devices extending along the bottom of the tube, and continuously removing the gaseous products of the calcination, immediately after their formation, through a vent extending along the top of the tube.

3. A method of producing alumina, comprising introducing an aluminum hydroxide containing boric acid in a quantity sufficient to effect volatilization of substantially the whole of the soda content of the aluminum hydroxide during the calcination into the upper end of an inclined refractory tube down which the aluminum hydroxide can pass, heating the aluminum hydroxide to a temperature between 1,300° C. and 1,400° C. by introducing a combustible gas at a velocity greater than that of flame propagation into series of burner devices extending along the bottom of the tube, continuously removing the gaseous products of the calcination, immediately after their formation, through a vent extending along the top of the tube, maintaining the solid material leaving the lower end of the inclined tube at a controlled but decreasing temperature in a heat-soak device constituted by a vertical tube connected to the lower end of the inclined tube, and removing calcined material from the discharge end of the heat-soak device by means of a take-off device.

References Cited

UNITED STATES PATENTS

| | | | |
|---|---|---|---|
| 811,433 | 1/1906 | Pechiney | 23—142 |
| 1,093,749 | 4/1914 | Weaver | 23—277 |
| 1,895,284 | 1/1933 | Hay | 23—277 |
| 1,943,821 | 1/1934 | Hanks et al. | 252—466 |
| 2,069,060 | 1/1937 | Fessler | 23—142 |
| 2,411,807 | 11/1946 | Riesmeyer | 23—143 |
| 2,961,297 | 11/1960 | Fenerty | 23—142 |
| 3,092,453 | 6/1963 | Gitzen | 23—143 |
| 3,175,883 | 3/1965 | Lindsay et al. | 23—142 |
| 3,262,754 | 7/1966 | Lindsay et al. | 23—142 |
| 3,264,069 | 8/1966 | Getty | 23—143 X |

FOREIGN PATENTS

| | | |
|---|---|---|
| 829,602 | 3/1960 | Great Britain. |
| 864,009 | 3/1961 | Great Britain. |
| 884,806 | 12/1961 | Great Britain. |

EARL C. THOMAS, *Primary Examiner.*

G. T. OZAKI, *Assistant Examiner.*